UNITED STATES PATENT OFFICE.

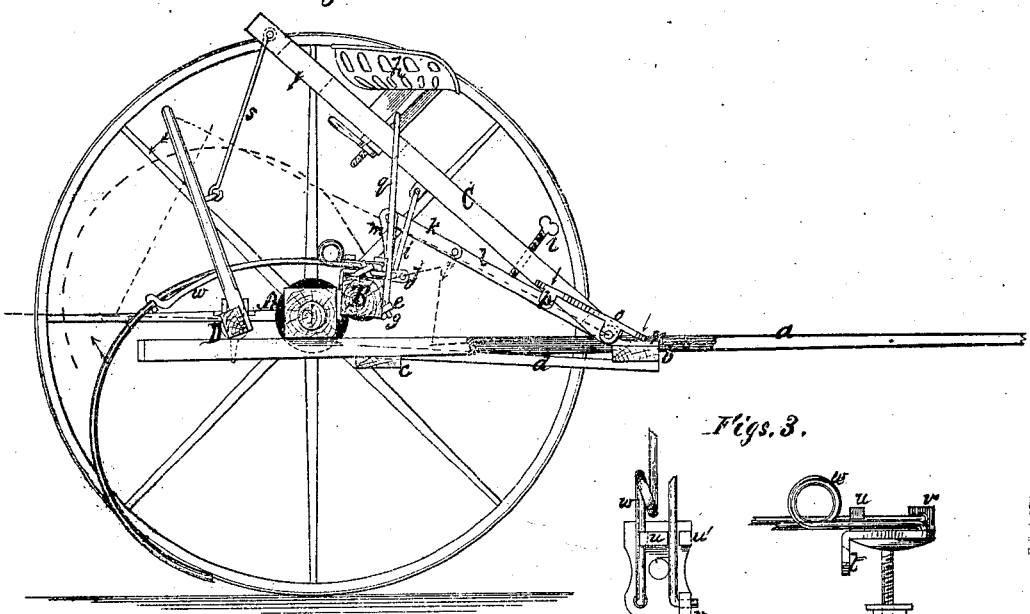
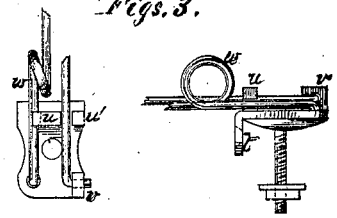
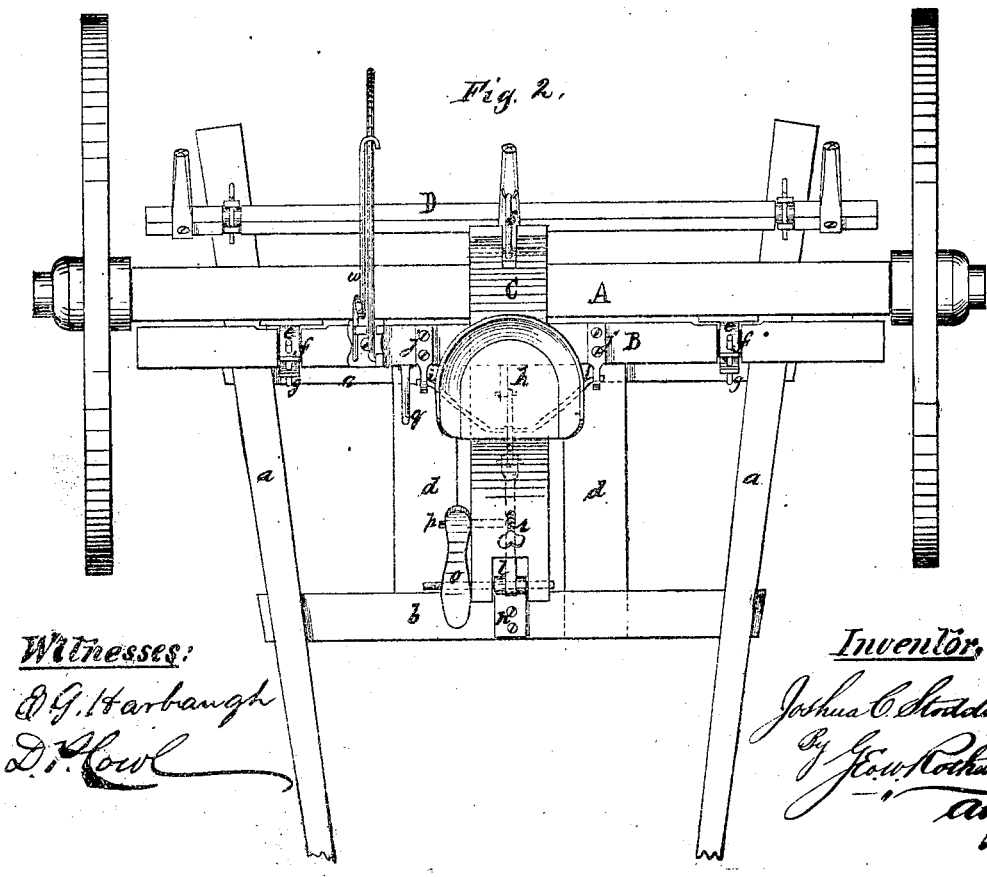

JOSHUA C. STODDARD, OF WORCESTER, MASSACHUSETTS.

IMPROVEMENT IN HORSE HAY-RAKES.

Specification forming part of Letters Patent No. 110,876, dated January 10, 1871.

*To all whom it may concern:*

Be it known that I, JOSHUA C. STODDARD, of Worcester, in the county of Worcester and State of Massachusetts, have invented certain new and useful Improvements in Horse Hay-Rakes; and I do hereby declare the following to be a full, clear, and exact description thereof, sufficient to enable those skilled in the art to which my invention appertains to fully understand and to make and use the same, reference being had to the accompanying drawing, forming part of this specification, and in which—

Figure 1 is a side elevation of a horse hay-rake provided with my improvements, one of the draft-wheels being removed. Fig. 2 is a top view of the same; and Fig. 3 shows, in plan and side view, one of the details of my invention, to be hereafter more fully referred to.

My said improvements relate more especially to that class of horse hay-rakes in which the weight of the driver is exerted upon the rake-head in such a manner that, by pressure on a treadle, a lock is released, and the weight of the driver causes the rotation of the rake-head and the consequent elevation of the teeth from the ground.

The object of my invention is to simplify and improve such rakes, and thus better adapt them to general and practical use and make their operation easy and satisfactory.

The present invention consists in the connection of the rolling clearer-bar with the hinged seat-board which operates the rake, so that as the rake-teeth are elevated the clearer is depressed by the same movement of the seat-board.

It also consists in a locking device and treadle of peculiar construction and arrangement, in combination with the hinged seat-board and rake-head and their connections, as will be hereinafter more fully explained.

My invention further consists in the construction and application of a socket secured to the rake-head for the attachment of the teeth, as hereinafter set forth.

Having thus briefly stated the nature of my said improvements, I will now proceed to describe them more fully in detail, referring to the accompanying drawing in the several figures, of which like letters indicate corresponding parts.

The running-gear or frame of my improved horse-rake may be like that shown in the drawing, or of any other suitable construction. That represented is composed of an axle, A, with traction-wheels, shafts *a a*, projecting in the rear of the axle and attached thereto, and transverse bars *b c*, secured to the shafts and connected by strengthening-pieces *d d*. To the front of the axle are affixed open bearings *e e*, which I prefer to make in U shape, provided with a base-plate, through holes in which the screws are passed, which secure the bearings in place.

The rake-head B, having been rounded at *f f*, so as to enter and turn freely in the bearings, is hung therein, after which pins *g g* are inserted, as shown, to retain the rake-head.

The head B is provided with teeth, which may be of any approved kind and secured by any desired means; but I have devised an improved socket or head for holding the teeth, which will be described farther on.

The driver's seat *h* is adjustable in a slot (shown by dotted lines in Fig. 1) in the seat-board C, which is hinged at its lower end to the cross-bar *b*, secured to the shafts.

The seat-board is maintained in an inclined position by a device, *i*, which I term a "crane," having connection with the seat-board and with the rake-head, so that the latter is made to support the weight of the driver. This crane, the form of which is shown in the drawing, is hung in a loop or eye on the under side of the seat-board, while its ends enter holes in bearings *j j* attached to the rake-head.

The bearings are formed each with a series of holes adapted to receive the ends of the crane, so that the latter may be adjusted nearer to or farther from the rake-head, to alter the leverage to compensate for the weight of the driver, whether he be heavy or light.

I desire to state that provision may be made for the attachment of the lower ends of the crane back of the center of the rake-head, as well as forward of the same, so that the weight of the driver may be thrown either backward or forward of the center of motion.

Under the seat-board is located a locking device composed of a jointed lever, *k l*, and arm *m*. The arm *m* is formed with a plate, which is secured to the front of the rake-head at the center.

To the upper end of the arm the part $k$ of the jointed lever is pivoted, and the outer end of the part $l$ of said lever (the two parts being connected by a pin) is held between lugs on a plate, $n$, attached to the cross-bar $b$ of the shafts by the same pin which constitutes the fulcrum of the hinged seat-board.

When the two members of the hinged jointed lever are in a line, as shown in Fig. 1, the rake-teeth are down and the head is kept from rolling, while the driver's seat is maintained in its elevated position; but when the central joint of the locking device is depressed, the weight of the driver being supported entirely upon the bearings $j\ j$ through the medium of the crane $i$, the rake-head is made to roll or partially turn by the lowering of the driver's seat, and the teeth are raised from the ground. The depression of the seat continues until the rake-head has made about a quarter-revolution, when its further downward progress is stopped by the crane coming into nearly a straight vertical line with the plates in which it has its bearings.

The jointed lever is thrown into and out of line by means of a treadle or pedal, $o$, having on its under side two pairs of lugs, drilled with eyes. The forward bearing of this pedal is on the same pin which passes through the lower end of the seat-board, while the rear bearing is formed by a pin, $p$, projecting from the side of the jointed lever $l$.

The driver's foot rests upon the pedal $o$, and when pressure is exerted on the rear end of the pedal the jointed lever is thrown out of line, while the contrary effect is produced by pressure on the front of the pedal.

To facilitate the movements of the rake-head, I provide a lever, $q$, which is secured to the front of the rake-head and extends up within easy reach of the driver. This lever is moved forward simultaneously with the depression of the rear part of the pedal, to start the rotation of the rake-head; and to lower the rake-teeth the lever $q$ is raised as pressure is exerted on the front of the pedal.

For the purpose of altering or limiting the movement of the locking-lever $k\ l$, I employ a set-screw, $r$, which passes through the seat-board. By turning this down, it forms a stop to prevent the parts of the lever from coming directly into line, and thus makes the operation of the locking device easier.

The clearer-fingers are attached to a rock-bar, D, mounted in bearings on the rear extensions of the shafts behind the axle. This device is connected by means of a rod, $s$, attached to the upper end of the seat-board, and to one of the clearer-fingers, or by other suitable connection, so that, simultaneously with the elevation of the rake-teeth, the depression of the clearers is effected, and by the same operation of the parts attached to the rake-head, as hereinbefore described.

The dotted lines in Fig. 1 indicate the elevated position of the rake-teeth and the depression of the clearers.

My improved attachment for the rake-teeth is shown in all the figures, but more particularly in Fig. 3, where it is enlarged.

A flange, $t$, is made on the socket, which laps over the rear side of the rake-head.

On the upper surface of the socket are lugs $u$, $u'$, and $v$, through which latter an eye is formed to receive the hooked end of the tooth, which is kept from lateral movement by its confinement between the lugs $u\ u'$.

The outer end of the spring $w$ is held in place by its connection with the tooth, while its inner portion rests in a groove in the lug $u$, the extreme inner end being bent downward and entering a hole in the socket, as shown.

It is important that the rake should be balanced, to insure its effective working, according to the weight of the driver exerted upon it. This may be effected either by a weight placed upon the seat, or connected more directly to the rake-head by means of a sliding or a weighted lever.

The adjustment of the driver's seat in a slot in the seat-board is not a feature of the present invention.

I am aware that a hinged seat-board supported upon the rake-head and provided with a locking device operated by the foot is not new. Therefore I do not claim such construction, broadly; but,

Having thus described my invention, what I do claim as new, and desire to secure by Letters Patent, is—

1. The connection of the clearer with the hinged seat-board, substantially as herein described, so that the vertical movements of the latter are imparted to the former.

2. A locking device composed of the rigid arm $m$, jointed lever $k\ l$, with pin $p$, the pedal $o$, plate $n$, and the main fulcrum-pin, in combination with the hinged seat-board, rake-head, crane, and the frame, all constructed and arranged to operate substantially as herein set forth.

3. In combination with the parts mentioned in the next preceding clause, the set-screw $r$ and rigidly-attached lever-handle $q$, arranged as herein specified, for facilitating the operation of the locking device.

4. The sockets for the rake-teeth and springs, made with lugs $u$, $u'$, and $v$, and adapted to secure the springs and teeth thereto without bolts or pins, as described, and attached to the rake-head in the manner herein set forth.

To the above specification of my invention I have signed my name this 26th day of November, 1870, in the presence of two subscribing witnesses.

J. C. STODDARD.

Witnesses:
JAMES H. WALL,
J. HENRY HILL.